G. C. ATKINSON.
SPRING WHEEL.
APPLICATION FILED MAY 20, 1920.

1,406,961.

Patented Feb. 21, 1922.

WITNESSES

GEORGE C. ATKINSON INVENTOR.

BY

ATTORNEY.

UNITED STATES PATENT OFFICE.

GEORGE C. ATKINSON, OF GEORGETOWN, TEXAS.

SPRING WHEEL.

1,406,961. Specification of Letters Patent. Patented Feb. 21, 1922.

Application filed May 20, 1920. Serial No. 382,783.

*To all whom it may concern:*

Be it known that I, GEORGE C. ATKINSON, a citizen of the United States, residing at Georgetown, in the county of Williamson and State of Texas, have invented certain new and useful Improvements in Spring Wheels, of which the following is a specification.

This invention has reference to resilient wheels and has for its principal object the provision of a resilient wheel designed as a substitute for the pneumatic tire type of wheel and of a novel construction sufficient to enable it to successfully stand up under the shocks and jars to which such wheels are ordinarily subjected, while at the same time having all the wearing qualities and resiliency of the pneumatic tire.

A further object of the invention is to provide a device of this character comprising a sectional inner structure consisting of spring tensioned felly blocks frictionally and resiliently supporting the wheel rim so as to hold the latter readily responsive to pressure applied externally to any part of the tire; the springs acting as a cushion or shock absorber.

Figure 1:
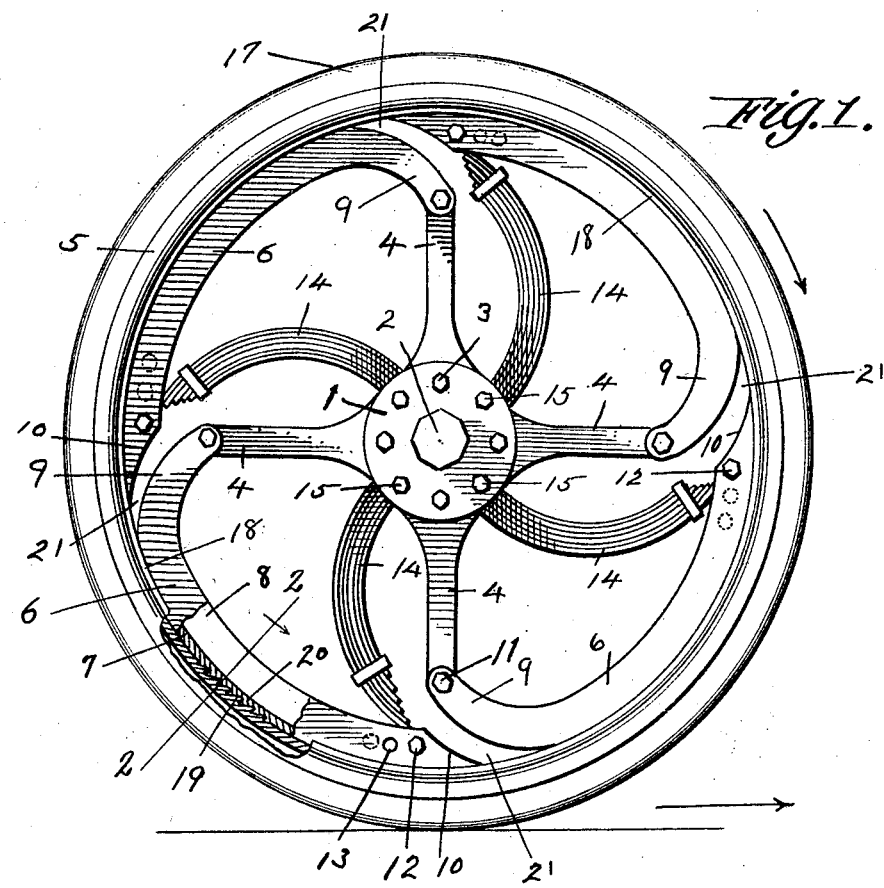
Figure 2:
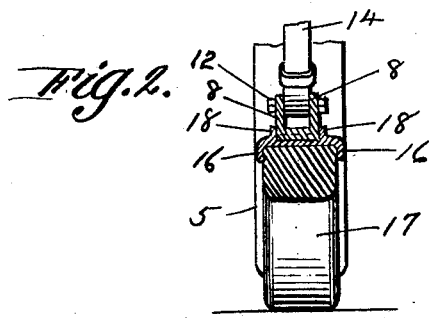

With the above and other objects in view the invention may be said generally to reside in the details of construction, combination and arrangement of parts as will be hereinafter more fully described and pointed out, reference being had to the accompanying drawings wherein:

Figure 1 is a side elevation of a wheel constructed in accordance with the principle of the invention, and Figure 2 is a vertical cross-sectional view taken on line 2—2 of Figure 1.

Primarily the invention is embodied in the novel form of inner wheel structure which carries and supports the tire and rim. This inner structure consists of a hub 1 which may be any of the usual types of hubs used in connection with resilient wheels and provided with the hub cap 2 and the usual allotment of spoke-sockets through which pass the spoke fastening bolts 3. Radiating from the hub, at diametrically opposite points, are spokes 4, preferably four in number and in shape about as illustrated, it being noted that they are thickened at their points of engagement with the hub so as to be properly strengthened where the pull is hardest, while the free, terminal end, of each spoke is spaced inwardly an appreciable distance from the wheel rim 5 as shown. The felly of the wheel is sectional in character being made up of a plurality of separate, disconnected and curved felloe blocks, each of which comprises an elongated body portion 6, U-shaped in cross section to provide a flat, substantial bearing surface or bottom 7 curved in conformity with the curvature of the wheel rim against which it is designed to rest. The side flanges 8 of the blocks are inclined upwardly from one end to provide a curved nose portion 9 while at their opposite ends they are provided each with a curved bearing surface, as indicated at 10, each block being arranged so that the nose portion of the subsequent block is adjacent to the rear bearing edges of the preceding block; the purpose of which will hereinafter be more fully explained. Each of the spokes 4 are adapted to have one block connected thereto by means of a bolt or other fastening element 11, inserted through the nose 9 and passing through suitable opening formed adjacent the end of the spoke, thus serving as a pivot about which the block may be moved. At the free end of every block is arranged a bolt or other member 12, which may be adjusted transversely of the bottom 7 through any of the spaced openings 13 provided in the side flanges 8, to which bolt is secured one end of a resilient member 14 preferably a leaf spring, the other end of which is bolted to a socket of the hub as indicated at 15, there being one of these springs between each pair of spokes 4. As shown to advantage in Figure 1, these springs are flexed so as to be normally under tension, with the brunt of their expansive force exerted against the end 10 of the blocks, giving the blocks a tendency to swing outwardly about the pivot 11 so that they will thus be caused to fit up against the rim of the wheel, the spring tending to hold them in close frictional contact therewith.

The outer structure of the wheel consists of the rim 5 which is flanged outwardly as at 16 to receive and hold the solid rubber tire or tread 17 and provided upon its inner periphery with an annular groove or channel which may be formed by the inwardly directed flanges 18 between which are received the blocks 6 of the sectional felly, each block fitting snugly within the channel so as to be held secure against any wabbling or sidewise movement. At intervals, the bottom of the channel is provided with a series of cross-cuts or teeth 19 projected at an incline, each block being likewise provided with a set of similar teeth formed on the bottom thereof as indicated at 20; the teeth of the blocks being adapted to be engaged by the teeth of the rim when moving adversely thereto, so as to prevent the blocks from sliding around in the channel of the rim without revolving the wheel, should the latter become imbedded in mud or sand so as to stick fast. When the wheel is assembled as illustrated in Figure 1 it is to be noted that each felloe block 6 extends from the spoke to which it is attached to the spoke of the succeeding block and that the curved nose 9 of the latter projects up over the bearing end 10 of the former. Each block is sustained in close contact with the bottom wall of the channel as previously explained and as the auto or other vehicle with which the wheels may be used, moves forward in the direction indicated by the arrow, the turning of the hub tends to pull the block around in the channel of the rim, but the blocks being forced into frictional engagement with the bottom wall of the channel by reason of the pressure of springs 14, in turn carry the rim around with them; the wheel thus revolving as a unit. In the event of the wheel becoming imbedded in sand or mud so that the outer wheel structure, that is, the rim and tire, would ordinarily tend to stick fast and remain stationary against the turning force exerted by the frictional engagement of the sliding block with the rim, the teeth projections 19 and 20 insure a positive interlocking of the rim and the felloe blocks during such a contingency, sufficient to enable the wheel to be turned under the impelling force of the motive power.

The resiliency of the wheel results from the facts that the felloe blocks are pivoted at one end and resiliently tensioned at the opposite end, so that whenever a shock or jar is occasioned at any point about the wheel, the wheel is enabled to respond readily and instantaneously since all or any of the blocks may swing inwardly or outwardly about their pivots as occasion requires, the springs acting not only as additional spokes to brace the wheel but as absorbers for taking up and distributing the shocks and jars incident to the traveling over rough and uneven roads, etc. Ordinarily each block is slightly spaced off from the next, as shown at 21, to allow for considerable pivotal movement of the block whenever any unusually heavy bump or jars are occasioned, the curvature of the edges 10 of each block providing bearing surfaces for the curved nose 9 of the succeeding block or vice versa, when the two are swung inwardly or outwardly to their maximum extent by the bounce of the wheel, so as to be thrown into contact with one another.

It may thus be seen that a wheel of this character by reason of its novel construction is equal, if not superior, to any other wheel in strength and resiliency, and that the inner structure or wheel proper, acts as a driving force in the operation of the car with which the wheels are used; each spring pressed block having a free and separate action without interference from any of the others. The pivotal arrangement of the blocks renders it more or less easy to remove and replace the tire when it becomes necessary and the fact that a solid tire, and not a pneumatic tire, is all that is required renders possible the elimination of punctures and blow outs, thus reducing the tire costs to minimum.

Having thus described the invention what I claim as new and desire to secure by Letters Patent is:—

1. A resilient wheel comprising a hub, spokes radiating therefrom, a member pivoted to each spoke and curved to form a separate felloe section, and springs connecting the free ends of said sections to the hub.

2. A resilient wheel comprising a hub, spokes radiating therefrom, a member pivoted to each spoke and curved to form a separate, independent, section of the wheel felly, springs under pressure connecting the free ends of the felloe sections with the hub, and an encircling rim slidably supported by said member.

3. A resilient wheel comprising a rim, a hub, spokes radiating from the hub, a member pivoted to each spoke and curved to form a separate, independent, felloe section having a substantial bearing surface, and springs connecting the free ends of each member with the hub and tensioned to urge said member outwardly in supporting engagement with the said encompassing rim.

4. A resilient wheel comprising a rim having an inner channel, a hub having spokes shortened inwardly of the rim channel, a plurality of separated disconnected felloe blocks arranged for successive sliding movement in one direction in the rim channel, each of said blocks being pivotally connected at one end to a shortened spoke, and a spring connecting the free end of each block with the hub.

5. A resilient wheel comprising a rim having a channeled inner periphery, a hub, short spokes radiating therefrom, a felly section pivoted to each spoke and curved to enter and extend substantially along the said inner peripheral channel of the rim, and a depressible spring connecting the free end of each felly section with the hub, said springs being normally tensioned to retain said section within the channel for locking the rim to the hub.

6. A resilient wheel comprising a rim having a channeled inner periphery, a hub, spokes radiating therefrom, a felly section pivotally supported from each spoke to slide within the channel of the said rim, said section being curved to enter and extend substantially along the said channel, a depressible spring connecting the free end of each section with the hub and normally tensioned to hold the section in frictional engagement with the rim and means formed on the contacting surfaces of the rim and felloe sections respectively to prevent any relative reverse movement.

7. A spring wheel comprising a wheel rim, an independently rotatable hub, a rim-driving element slidably engaged with the inner circumferential face of the rim and having positive driving engagement therewith, and means connecting said rim driving element to the rotatable hub, said means including a tensionable element engaging the rim driving element for yieldably holding it against the wheel rim.

In testimony whereof I affix my signature in presence of two witnesses.

GEORGE C. ATKINSON.

Witnesses:
 ED BOLDING,
 F. O. HUMPHREY.